March 21, 1933.   O. MITCHELL   1,902,177

METHOD OF PRODUCING SAWS

Filed July 23, 1931

INVENTOR:
ORVILLE MITCHELL
By Bruce A. Elliott
ATTORNEY.

Patented Mar. 21, 1933

1,902,177

UNITED STATES PATENT OFFICE

ORVILLE MITCHELL, OF DALLAS, TEXAS

METHOD OF PRODUCING SAWS

Application filed July 23, 1931. Serial No. 552,650.

This invention relates to a novel method of making saws for use, particularly, in cotton cleaning machines. The method is designed especially for making band saws, which are adapted to be secured circumferentially at intervals around the surface of a cylinder, although it can also be used to advantage in making circular disk saws, such as are used in gotton gins.

Saw bands as employed by me are made from ribbon steel, the teeth being produced by dieing out indentations in each edge of the ribbon. The steel obviously has to be thick enough to make a tooth that will withstand ordinary operating strains. As a result of this required thickness, the points of the teeth are blunt and do not properly take hold of the cotton fibers. This constitutes a serious disadvantage, causing the machine to lack capacity and sometimes to waste cotton. Sharpening the teeth by grinding and filing has been resorted to, but this is an expensive operation and often objectionable because of the practical impossibility of securing uniformity in the size and shape of the teeth.

The invention consists broadly in providing saw teeth in a metal disk or strip having the points thereof tapered to a sharp point by peening. In the preferred embodiment of the invention the teeth are first cut oversize, the points thereof sharpened or tapered by peening and the teeth then recut or trimmed to remedy the distortion produced by the peening operation.

In a modified form of the invention the metal is first peened at intervals corresponding to the position the teeth are to occupy, after which the teeth are cut at such points thereby eliminating the operation of recutting, or trimming, the teeth. The method of first cutting the teeth and then peening the points is preferred, however, in most cases, for the reason that great uniformity and regularity in production of the teeth can be secured, whereas, when the metal is first peened before the teeth are cut the material, particularly if in ribbon form, will often be somewhat twisted where it is peened and the finished saw teeth are apt to be somewhat distorted.

The invention is illustrated as applied to the making of band saws in the accompanying drawing, in which:—

Figure 1 indicates a section of ribbon steel from which the saw is made;

Figure 1:
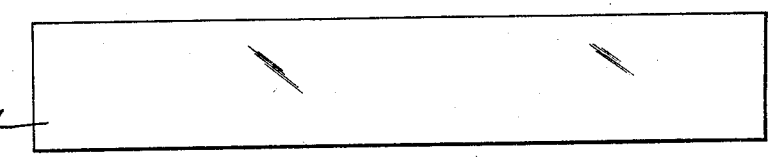
Figure 2:
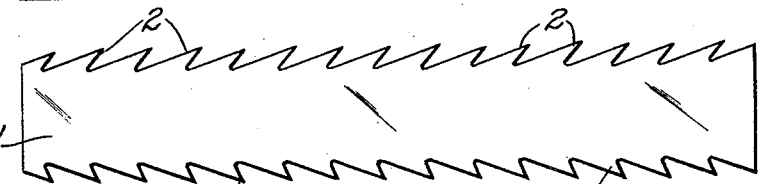
Figure 2 illustrates the first step in the process, which consists in cutting out by means of dies in either edge of the ribbon, saw teeth that are slightly over-size.
Figure 3:
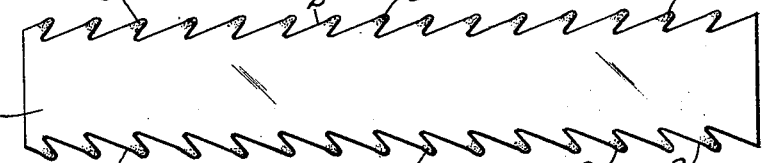
Figure 3 illustrates the next step in the method, which consists in peening or hammering the points of the teeth to make them taper to a sharp point.
Figure 4:
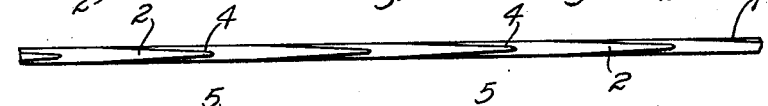
Figure 4 is an edge view on an enlarged scale of the saw illustrated in Figure 3.
Figure 5:
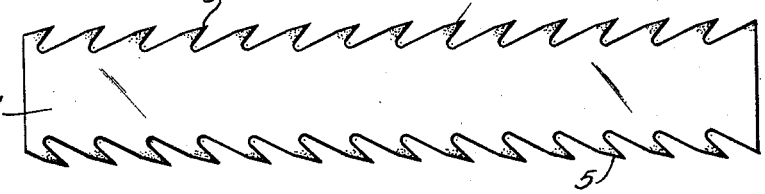
Figure 5 illustrates the saw of Figure 3 after the teeth have been recut or trimmed to the desired size.
Figure 6:
Figure 6 illustrates the completed band saw made by turning up at right angles to the body of the ribbon the edge portions thereof.
Figure 7:
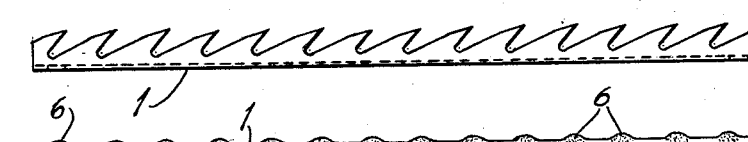
Figure 7 is a view in side elevation of the completed saw.
Figure 8:
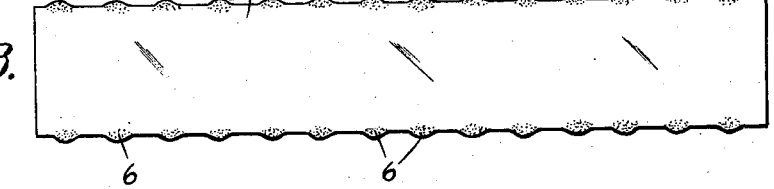
Figure 8 illustrates a modification, consisting in peening the edges of the ribbon steel before cutting the teeth therein.

In practicing my improved method a length of ribbon steel 1 is run through a saw cutting machine to provide its opposite side edges with saw teeth 2, which are slightly over-size. The points are then hammered or peened, as indicated at 3, to cause them to taper to a sharp point, as represented at 4 in Figure 4. As the peening or hammering of the points of the teeth necessarily spread the material and distorts the teeth, the latter are next subjected to a cutting or trimming operation and at the same time reduced to the desired size, as indicated at 5 in Figure 5. Finally, the edge portions of the ribbon containing the saw teeth are bent out at right angles to the body of the ribbon to provide two parallel rows of saw teeth projecting from the same side of the ribbon, as illustrated in Figures 6 and 7. In the modified method, the opposite edges of the ribbon 1 are peened at intervals, as indicated at 6 in Figure 8, such intervals corresponding to the position to be occupied by the saw teeth, and the saw teeth are then cut at such points, with the result that the cut teeth will have their points tapered, and as in this operation the saw teeth are cut to the desired size, and as the cutting necessarily removes the portion of the metal caused to spread by the peening beyond the area to be occupied by the teeth, no subsequent trimming or cutting of the teeth is necessary.

All of the operations described are automatically performed as the steel ribbon is fed through the saw cutting machine, and no extra time or expense is required for sharpening the teeth by this peening method.

The outstanding advantage of the method consists in the fact that the produced teeth are of uniform size and sharpness, and as this result is secured as part of a continuous operation which includes the cutting of the teeth, such perfected saw teeth, that is, teeth having the required sharpness of points, are produced without any additional expense over that involved in cutting the saw teeth, other than the slight initial expense of equipping the saw cutting machine with the peening implements, and this expense is negligible as related to continuous production.

I claim:—

1. The method of making saws which consists in a continuous operation, in cutting over-size saw teeth in the edge of a body of metal, thereafter peening the points of said teeth to sharpen them and finally re-cutting the teeth to the proper size.

2. The method of making saw bands which consists in cutting over-size teeth in the opposite edges of a length of ribbon steel, peening the points of said teeth to sharpen them, recutting the saw teeth to the desired size and then bending the opposite edge portions of the ribbon at right angles to the body thereof in the same direction.

3. The method of making saws which consists in a continuous operation in producing saw teeth in the edge of a suitable body of metal, thereafter peening said teeth to sharpen the points thereof, and finally cutting away the metal spread by the peening operation beyond the normal areas of the teeth.

In testimony whereof, I have hereunto set my hand.

ORVILLE MITCHELL.